(12) United States Patent
Mandler

(10) Patent No.: US 11,697,160 B2
(45) Date of Patent: Jul. 11, 2023

(54) TOOL DRIVE UNIT, TURNING DEVICE AND TURNING METHOD

(71) Applicant: OptoTech Optikmaschinen GmbH, Wettenberg (DE)

(72) Inventor: Roland Mandler, Heuchelheim (DE)

(73) Assignee: OptoTech Optikmaschinen GmbH, Wettenberg (DE)

( * ) Notice: Subject to any disclaimer, the term of this patent is extended or adjusted under 35 U.S.C. 154(b) by 233 days.

(21) Appl. No.: 17/063,898

(22) Filed: Oct. 6, 2020

(65) Prior Publication Data

US 2021/0107065 A1    Apr. 15, 2021

(30) Foreign Application Priority Data

Oct. 14, 2019    (DE) .................. 10 2019 127 628.4

(51) Int. Cl.
| | |
|---|---|
| *B23B 5/36* | (2006.01) |
| *B23Q 5/02* | (2006.01) |
| *B23B 1/00* | (2006.01) |
| *B24B 13/00* | (2006.01) |

(52) U.S. Cl.
CPC .................. *B23B 5/36* (2013.01); *B23B 1/00* (2013.01); *B23Q 5/02* (2013.01); *B23B 2210/02* (2013.01); *B23B 2215/40* (2013.01); *B24B 13/00* (2013.01)

(58) Field of Classification Search
CPC ......... B23B 5/36; B23B 29/125; B23B 29/12; B23B 2215/40; B23B 1/00; B23Q 5/027; B23Q 5/02
See application file for complete search history.

(56) References Cited

U.S. PATENT DOCUMENTS

| | | | |
|---|---|---|---|
| 2007/0107568 A1 | 5/2007 | Campbell et al. | |
| 2009/0022554 A1* | 1/2009 | Gourraud | B23B 27/145 |
| | | | 407/113 |
| 2015/0050864 A1* | 2/2015 | Stahringer | B24B 13/01 |
| | | | 451/42 |
| 2020/0094327 A1* | 3/2020 | Muramatsu | G05B 19/4093 |

FOREIGN PATENT DOCUMENTS

| | | |
|---|---|---|
| DE | 20 2007 008203 | 10/2008 |
| DE | 10 2009 058649 | 6/2011 |
| EP | 0 440 578 | 8/1991 |
| EP | 2 998 067 | 3/2016 |
| KR | 2004 0096676 | 11/2004 |

* cited by examiner

*Primary Examiner* — Alan Snyder
(74) *Attorney, Agent, or Firm* — Clark & Brody LP

(57) ABSTRACT

A tool drive unit for a turning device for machining workpieces has a tool holder driven in a displaceable manner along an infeed direction by a first linear motor and driven in a pendular/displaceable manner in a direction transverse to the infeed direction by a second linear motor. Both linear motors have a moving coil/piezo element. The turning device has a main infeed drive, which produces a primary infeed movement of a turning tool in an infeed direction, and has a main transverse drive which produces a primary transverse movement in a transverse direction transversely to the infeed direction. The turning device has a secondary transverse drive whose movements are oriented in the same direction as the main transverse drive, wherein the turning tool and the axis of rotation can be moved towards one another and away from one another by the superimposition of primary and secondary transverse movements.

12 Claims, 9 Drawing Sheets

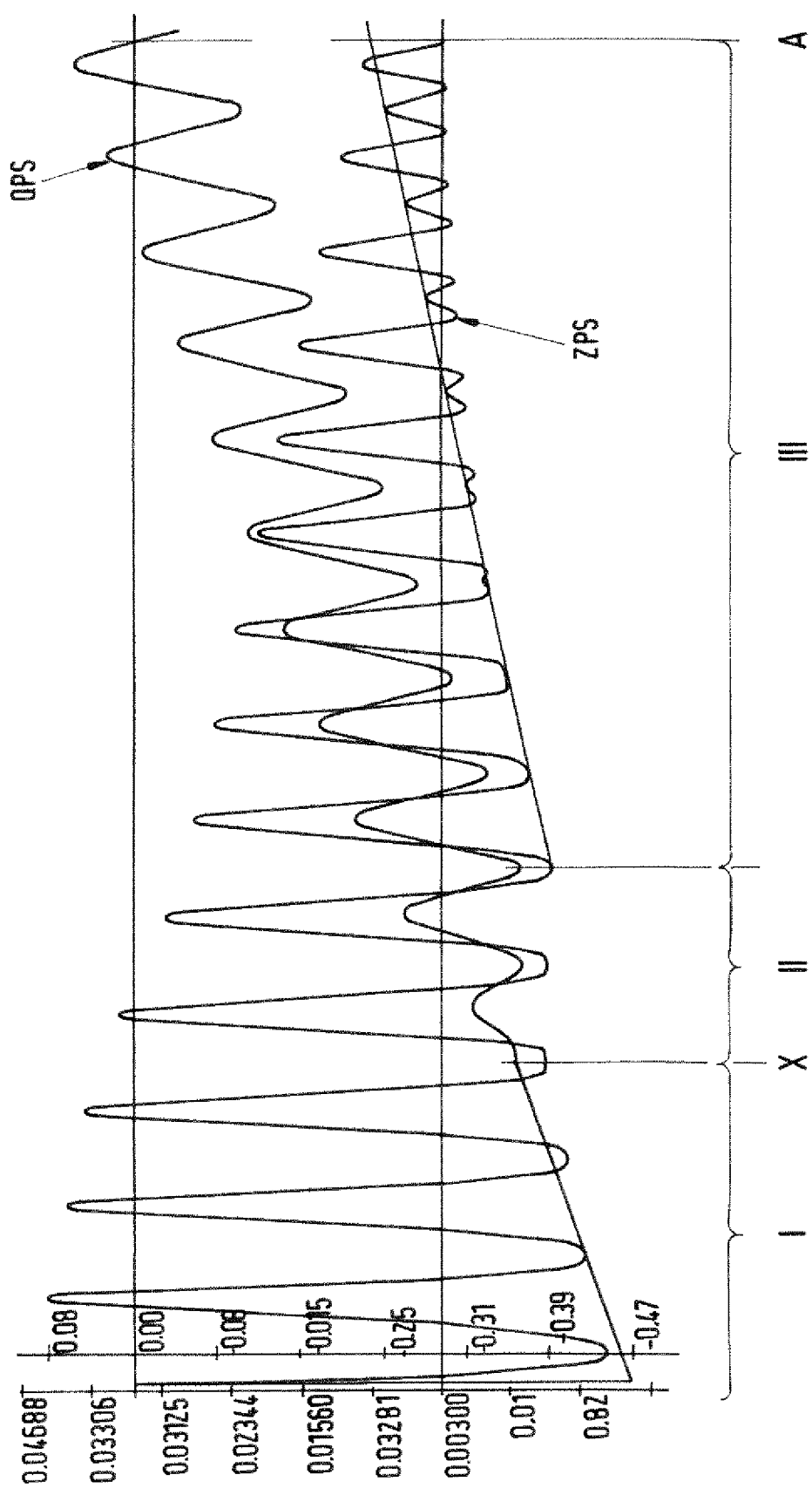

TOOL DRIVE UNIT, TURNING DEVICE AND TURNING METHOD

The invention relates to a tool drive unit, to a turning device, to a method for the cutting machining of an end face of a workpiece, which is driven about a virtual axis of rotation, with a turning tool, and to the use of the tool drive unit and of the turning device for carrying out the inventive method.

Tool drive units serve to position a tool in an automated manner at defined positions of a machine in order to be able to exactly machine a workpiece. Inter alia, such tool drive units are found in turning devices in order to be able to position a turning tool having a cutting edge relative to a rotating workpiece. According to the method, the turning tool is then brought into engagement with the workpiece and a chip is shaved off the workpiece by the rotating principal movement of the workpiece. Movements of the turning tool relative to the workpiece allow the latter to be machined to give a desired shape by cutting removal of material.

EP 2 998 067 A2 thus for example discloses a turning device which has two turning stations each with a rotatable workpiece spindle for receiving a lens blank and each with a turning tool for the cutting machining of a received lens blank. The lens blank is rotated about a virtual axis of rotation by means of the workpiece spindle. For machining, the turning tool is brought further to the outside in engagement with the end face and then moved in the direction of the axis of rotation. This results in a spiral work path. During lens machining, and in particular during spectacle glass manufacture, there are created here surfaces with a height profile. These machined faces are not rotationally symmetrical. It is therefore required for the infeed of the turning tool to be adapted to correspond to the height profile during each revolution of the lens blank. Use is made for this purpose of linear motors which operate at a very high speed and which have a small adjustment travel. They have piezo actuators or moving coils and are referred to, inter alia, as fast tools or fast tool servo(motor)s.

A problem in the prior art is the observance of the manufacturing tolerances in the region which directly surrounds the axis of rotation. If the tool is lifted too early from the end face, a stub remains centrally around the axis of rotation. If the turning tool is moved completely up to the axis of rotation, the cutting edge of the turning tool already partially projects beyond the axis of rotation. There can then occur contact between the blunt rear side of the cutting edge and the already machined surface, which is damaged as a result. In this region, the workpiece runs past the cutting edge particularly in the incorrect or reverse direction. The more concave or oblique the end face is formed in the region of the axis of rotation, the greater this problem becomes. In addition, the problem is extremely critical specifically in the case of optical lenses and glasses since optical defects result in the centre of the lens. One therefore manages for example by using the smallest possible tool radii, a reduction in the rotational speed, a reduction in the contact pressure and by finishing operations such as polishing. The known small tool radii thus already make prismatic machining problematic since, especially in the case of optical lenses and glasses, the surface qualities for spheres and cylinders in the machining centre can be kept within tolerance only with difficulty. However, the production times are long and the manufacture of a high-quality surface in the machining centre is expensive.

The object of the invention is therefore to provide devices and methods for the turning machining of a workpiece which allow quick and precise machining of the surface up to the axis of rotation of the workpiece. A solution which can be retrofitted into existing turning devices would be desirable here.

In a tool drive unit for a turning device for the cutting machining of workpieces, having a tool holder for receiving a turning tool with a cutting edge, wherein the tool holder is driven in a displaceable manner, in particular in a linearly displaceable manner, along an infeed direction by a first linear motor having a first moving coil or a first piezo element, the invention provides that the tool holder is driven in a pendular or displaceable manner in a transverse direction transversely to the infeed direction by a second linear motor having a second moving coil or a second piezo element.

An advantage of this is that completely novel movement kinematics can be achieved during the machining of work surfaces. Whereas before quickly oscillating changes of position were possible only in the infeed direction, the cutting edge can now also be moved in an extremely quickly oscillating manner in the transverse direction. It is thus also possible to use turning tools having a larger radius of curvature, because work paths on the workpiece surface are now possible in which the cutting edge can be better manoeuvred around positions such that no material removal occurs at undesired locations. During the machining of an end face of a rotating workpiece, it is thereby possible, depending on the angle of rotation position, to deviate to the left or right from the actual machining path. If the cutting edge is rotated through 90 degrees, there is additionally the option of moving the cutting edge stutteringly along the machining path. The linear motors have piezo actuators or moving coils and can also be referred to as fast tools or fast tool servo(motor)s. In principle, the invention could also be realized with technically differently configured fast tools or fast tool servo(motor)s.

If it is wished to realize the tool movement profiles in the transverse direction at the same time, the design option according to the invention consists in the fact that the tool holder is driven in a pendular or displaceable manner in a second transverse direction transverse to the infeed direction and transversely to the first transverse direction by a third linear motor having a third moving coil or a third piezo element. The tool holder can thus be moved in all three machine axis directions, that is to say moved three-dimensionally in a quickly oscillating manner, in particular with respect to the infeed depth (towards/away with respect to the workpiece) by the first linear motor, transversely to the cutting direction (to the left/right with respect to the cutting direction) by the second linear motor and along the cutting direction (forth/back with respect to the cutting direction) by the third linear motor.

Optionally, the first and the second linear motor (and also the optional third linear motor) can be arranged within a common housing. By virtue of the small adjustment travels in the transverse and infeed direction, such a housing can be configured to be relatively small. In this way there is provided a finished assembly which is both interchangeable and can be retrofitted into existing machines. The tool holder should project out of the housing.

In a first variant, the first linear motor, together with the tool holder, is driven in a pendular or displaceable manner in the transverse direction by the second linear motor (optionally also in a pendular or displaceable manner in the second transverse direction by the optional third linear motor). A stable mounting of the first linear motor and of the tool holder is thus possible. The first linear motor and the tool holder are preferably arranged on a slide on which they are mounted in a displaceable manner by means of the second linear motor. It is also possible for this slide to be arranged in the optional common housing. Optionally, the tool holder can be rigidly connected to the first linear motor. This allows high-precision adjustment travels. Likewise, the tool holder can be optionally rigidly connected to the second linear motor. Its adjustment commands can thus be implemented with high precision.

In a second variant, the first linear motor and the second linear motor (optionally also the optional third linear motor) are fastened relative to one another in a fixed manner. They can thus not move relative to one another. This allows the masses which are to be moved to be reduced and quicker adjustments to be formed than if one of the linear motors has to be concomitantly moved by the other. It is possible here that the tool holder is connected to the first linear motor in a floating or pendular manner or via a bending element. Defined movements between the tool holder and the first linear motor which the tool holder carries out by means of the second linear motor are thus possible. In addition or alternatively, the tool holder can be connected to the second linear motor in a floating or pendular manner or via a bending element. Defined movements between the tool holder and the second linear motor which the tool holder carries out by means of the first linear motor are thus possible.

In one embodiment of the tool drive unit, there is provision that the tool holder, the first linear motor and the second linear motor (optionally also the optional third linear motor) form an assembly or are part thereof, wherein the assembly is arranged on a cross slide. A cross slide allows additional movements for positioning the tool holder, which is helpful particularly on account of the limited adjustment travels of the moving coil or piezo elements. Cross slides are additionally already present in a multiplicity of machine tools, with the result that the assembly can be retrofitted in a simple manner by being placed on such cross slides. The assembly can in particular also include the common housing of the first and second linear drive (optionally also the optional third linear motor).

Optionally, the cross slide has a cross slide drive by means of which the assembly is driven in a linearly displaceable manner along the infeed direction and in a linearly displaceable manner along the transverse direction. Movements which the moving coil or piezo elements could not implement alone on account of the limited adjustment travels can thus be implemented.

The first and second linear drive (optionally also the optional third linear motor) and the cross slide drive preferably have a common control or regulating unit. This makes it possible for the movements for positioning the tool holder to be superimposed in a targeted manner. The regulating unit should control or regulate the rotation of the workpiece for the same reason.

In a more detailed configuration, the free adjustment travels of the cross slide are at least ten times greater than the free adjustment travels of the first and second linear motor (optionally also of the optional third linear motor). Large adjustment travels, for example for changes of workpiece or tool, are thus made possible.

Furthermore, there is provision in one specific embodiment that the free adjustment travel of the first linear motor along the infeed direction is at least five times, preferably at least eight times, and particularly preferably at least ten times, as great as the free adjustment travel of the second linear motor in the transverse direction. The advantage of this is that, during turning, very large height differences can be generated on the surface by pendular movements of the first linear motor, whereas almost ever only very small corrections of the tool cutting edge are required in the transverse direction. The small adjustment travels in the transverse direction allow a stable mounting and a focusing of the second linear motor on quick short movements. The optional third linear motor preferably has a free adjustment travel in the transverse direction which is less at least by a factor of 5, preferably at least by a factor of 8, and particularly preferably at least by a factor of 10, than the free adjustment travel of the first linear motor along the infeed direction.

In practice, it is appropriate to configure the tool drive unit in such a way that the free adjustment travel of the first linear motor along the infeed direction is between 5 mm and 60 mm, preferably between 10 mm and 50 mm, further preferably between 15 mm and 40 mm, still further preferably between 18 mm and 35 mm, and particularly preferably between 20 mm and 30 mm. This adjustment travel is sufficient in practice for most height profiles to be turned quickly.

Moreover, it is appropriate in practice to configure the tool drive unit in such a way that the free adjustment travel of the second linear motor and/or of the optional third linear motor in the transverse direction is between 0.5 mm and 10.0 mm, preferably between 1.0 mm and 7.0 mm, further preferably between 1.2 mm and 5.0 mm, still further preferably between 1.4 mm and 3.5 mm, and particularly preferably between 1.5 mm and 2.5 mm. This adjustment travel is sufficient in practice for most corrections of the tool holder in the transverse direction relative to the workpiece.

On the tool holder there can be optionally arranged a turning tool with a cutting edge. This can be for example a cutting insert or an indexable cutting insert. The cutting edge should in particular be formed in a defined manner. The cutting edge can have a curvature, preferably in a cutting edge plane, and a cutting edge radius. The curvature serves to ensure that only part of the cutting edge length engages in the workpiece and that a certain degree of a concave groove is cut into the workpiece. The cutting edge radius is intended to define the sharpness of the cutting edge.

In a preferred configuration, the curvature of the cutting edge of the turning tool has a radius between 3.0 mm and 12.0 mm, preferably between 3.5 mm and 10.0 mm, further preferably between 4.0 mm and 9.0 mm and particularly preferably between 5.0 mm and 8.0 mm. An advantage of such large tool radii is that the spiral length necessary for producing a flat surface is short. Thus, for example, the spiral length when producing a flat surface of 70 mm diameter, which approximates to the machining surface of lens blanks for spectacle glass manufacture, is halved, from approximately 72 m with a 2 mm tool radius to approximately 38 m with a tool radius of 8 mm. Correspondingly, machining times are considerably shortened even without the rotational speed of the workpiece having to be increased for this purpose. Such large radii thus allow a workpiece to be machined quickly and efficiently. Here, the second linear drive makes it possible to compensate for problems in the production of height profiles on the machining surface which typically entail large tool radii.

The cutting edge radius of the cutting edge of the turning tool is preferably between 0.5 µm and 8.0 µm, preferably between 1.0 µm and 7.0 µm, further preferably between 1.5 µm and 5.0 µm and particularly preferably between 2.0 µm and 3.0 μm. These cutting edge radii are particularly suitable for machining materials for optical lenses, such as glass and plastic.

Furthermore, the cutting edge of the turning tool should consist of natural diamond, of synthetic diamond or of ceramic, or have a CVD diamond layer (CVD=chemical vapour deposition) on a carrier substrate. This makes the cutting edge long-life and its geometry hardly changes over its lifetime.

The cutting edge typically has a main cutting direction in which the cutting edge and the workpiece are to be moved relative to one another for machining. The transverse direction is preferably oriented transversely to this main cutting direction. Alternatively or additionally superimposed, however, the transverse direction can also be oriented in the same direction as the main cutting direction.

The invention additionally relates to a turning device for the cutting machining of workpieces, having a workpiece holder, which is designed to receive the workpiece and is driven to rotate about a virtual axis of rotation, and having a turning tool with a cutting edge. The turning device additionally has a main infeed drive which produces a primary infeed movement in an infeed direction, wherein the turning tool and the workpiece holder can be moved towards one another and away from one another by the infeed movement, this preferably occurring substantially or exactly in the same direction as the axis of rotation. In addition, the turning device has a main transverse drive which produces a primary transverse movement in a transverse direction transversely to the infeed direction, wherein the turning tool and the axis of rotation can be moved towards one another and away from one another by the primary transverse movement, this preferably occurring substantially or exactly in a transversely directed orientation to the axis of rotation. According to the invention, there is provision here that the turning device has a secondary transverse drive whose secondary transverse movements are oriented (at least substantially or exactly) in the same direction as those of the main transverse drive, wherein the turning tool and the axis of rotation can be moved towards one another and away from one another by the superimposition of primary and secondary transverse movements.

Advantages of this are the novel possibilities of the movement kinematics in the machining of work surfaces. The cutting edge can now be moved in the transverse direction in an extremely quickly oscillating manner. Consequently, turning tools having a larger radius of curvature can also be used because work paths on the workpiece surface are now possible in which the cutting edge can be better manoeuvred around positions such that no material removal occurs at undesired locations. During the machining of an end face of a rotating workplace, it is thereby possible, depending on the angle of rotation position, to deviate to the left or right from the axial machining path. If the cutting edge is rotated through 90 degrees, there additionally exists the option of moving the cutting edge stutteringly along the machining path. The absolute cutting speed can thus for example be reduced briefly in order to implement a positional change of the cutting edge in the infeed direction. This makes it possible to implement steeper rises in the height profile and for example to compensate for an otherwise excessively slow change of the infeed.

The workpiece holder can be designed with a workpiece spindle drive to be driven to rotate about a virtual axis of rotation.

The workpiece can be an optical lens or an optical lens blank, and the workpiece holder can be designed to receive an optical lens or an optical lens blank.

In the turning device according to the invention, it is alternatively or additionally possible for the relative movements according to the invention to be generated on the part of the workpiece holder. On account of the lower mass inertia, the secondary transverse movement and the secondary infeed movement should preferably be carried out by the turning tool. In particular, the primary transverse movement and the primary infeed movement can optionally be carried out by moving the workpiece holder or the turning tool. In one specific embodiment, there is provision that a tool drive unit as described above and below carries out at least the secondary transverse movement and the secondary infeed movement.

In one specific embodiment, there is provision that the turning device has a tool drive unit as is described above and below, wherein the turning tool with the cutting edge is received in the tool holder, wherein the first linear motor produces a secondary infeed movement in the infeed direction which is oriented (at least substantially or exactly) in the same direction as that of the main infeed drive, wherein the turning tool and the workpiece holder can be moved towards one another and away from one another by the superimposition of primary and secondary infeed movements, and wherein the second linear motor forms the secondary transverse drive. The advantages correspond in each case to those which are described in relation to the optional design possibilities of the tool drive unit.

Optionally, the turning device can have a tool drive unit in which the tool holder, the first linear motor and the second linear motor form an assembly or are part thereof, wherein the assembly is arranged on a cross slide, and wherein the cross slide belongs to the main infeed drive and main transverse drive and, as movement axes, allows the primary infeed movement and primary transverse movement.

In principle, optional design variants of the turning device also exist in the optional design variants of the tool drive unit. This means that the turning device can optionally be equipped with one or more of the following features, with reference being made to the respective above-described advantage statements:

that the first linear motor, together with the tool holder, is driven in a pendular or displaceable manner in the transverse direction by the second linear motor;

that the first linear motor and the tool holder are arranged on a slide on which they are mounted in a displaceable manner by means of the second linear motor;

that the tool holder is rigidly connected to the first linear motor;

that the tool holder is rigidly connected to the second linear motor;

that the first linear motor and the second linear motor are fastened relative to one another in a fixed manner;

that the tool holder is connected to the first linear motor in a floating or pendular manner;

that the tool holder is connected to the second linear motor in a floating or pendular manner;

that the tool holder, the first linear motor and the second linear motor form an assembly or are part thereof, wherein the assembly is arranged on the cross slide;

that the tool holder is driven in a pendular or displaceable manner in a second transverse direction transversely to the infeed direction and transversely to the first transverse direction by a third linear motor having a third moving coil or a third piezo element;

that the cross slide has a cross slide drive by means of which the assembly is driven in a linearly displaceable manner along the infeed direction and in a linearly displaceable manner along the transverse direction;

that the free adjustment travels of the cross slide, in particular the primary infeed movements and primary transverse movements, are at least ten times greater than the free adjustment travels of the first and second linear motor or of the secondary infeed movement and secondary transverse movement;

that the free adjustment travel of the first linear motor along the infeed direction is at least five times, preferably at least eight times, and particularly preferably at least ten times greater than the free adjustment travel of the second linear motor in the transverse direction;

that the free adjustment travel of the first linear motor along the infeed direction is between 5 mm and 60 mm, preferably between 10 mm and 50 mm, further preferably between 15 mm and 40 mm, still further preferably between 18 mm and 35 mm, and particularly preferably between 20 mm and 30 mm;

that the free adjustment travel of the second linear motor in the transverse direction is between 0.5 mm and 10.0 mm, preferably between 1.0 mm and 7.0 mm, further preferably between 1.2 mm and 5.0 mm, still further preferably between 1.4 mm and 3.5 mm, and particularly preferably between 1.5 mm and 2.5 mm;

that the cutting edge is formed in a defined manner;

that the cutting edge has a curvature, preferably in a cutting edge plane, and a cutting edge radius;

that the curvature of the cutting edge of the turning tool has a radius between 3.0 mm and 12.0 mm, preferably between 3.5 mm and 10.0 mm, further preferably between 4.0 mm and 9.0 mm and particularly preferably between 5.0 mm and 8.0 mm;

that the cutting edge radius of the cutting edge of the turning tool is between 0.5 μm and 8.0 μm, preferably between 1.0 μm and 7.0 μm, further preferably between 1.5 μm and 5.0 μm and particularly preferably between 2.0 μm and 3.0 μm;

that the cutting edge of the turning tool consists of natural diamond, of synthetic diamond or of ceramic, or has a CVD diamond layer (CVD=chemical vapour deposition) on a carrier substrate;

that the cutting edge (21) has a main cutting direction (H) in which the culling edge (21) and the workpiece (100) are to be moved relative to one another for machining, and further of the aforementioned optional configurations of the tool drive unit.

Furthermore, the invention relates to a method for the cutting machining of an end face of a workpiece, which is driven about a virtual axis of rotation, with a turning tool having a cutting edge, comprising the following steps:

rotating the workpiece about the virtual axis of rotation;

bringing the cutting edge into engagement with the end face of the workpiece at a distance from the axis of rotation; this occurs in particular while the workpiece rotates about the virtual axis of rotation;

carrying out a primary transverse movement of the cutting edge towards the axis of rotation while the culling edge continues to engage in the end face of the rotating workpiece, with the result that the cutting edge is guided along a spiral work path over the end face by the superimposition of the rotation of the workpiece and the transverse movement of the cutting edge;

superimposing the primary transverse movement with an (at least substantially or exactly) identically directed secondary transverse movement of the culling edge which occurs towards the axis of rotation and away from the axis of rotation, wherein the secondary transverse movement is carried out in dependence on the angle of rotation position of the workpiece.

An advantage of this is that the primary transverse movement can be carried out by a first drive which is designed for rather slow and wide adjustment travels, whereas the secondary transverse movement can be implemented by a drive which is designed for short, quick and direction-changing adjustment travels. Consequently, the position of the cutting edge along the machining path according to the primary transverse movement can be changed locally with the secondary transverse movement in a targeted manner. This allows for example cutting edges with a large radius to be manoeuvred around elevations on the machining surface which are to be generated locally. A situation is thus prevented in which such elevations are unintentionally equalized. This is accomplished even in the region around the axis of rotation because one is capable of determining the angle of rotation at which the cutting edge is moved up closer to the axis of rotation and the angle of rotation at which it is not. Here, the primary transverse movement and the secondary transverse movement should be produced by different drives. The method can be carried out in particular with the use of a tool drive unit or turning device as described above and below, with the respective optional design options.

The method is particularly suitable if the workpiece is an optical lens or an optical lens blank having a curved end face. The method allows a machining surface to be produced which has a tangent which is not orthogonal to the axis of rotation in the region of the axis of rotation. A high degree of importance is attached to this particularly in the production of spectacle glasses because prescription surfaces and prism angles have to be produced here. In a good approximation, the surface around the axis of rotation can often be considered as a prismatic surface, that is to say as an inclined plane with respect to the axis of rotation.

In one method variant, there is provision that the secondary transverse movement of the cutting edge has exactly one stroke consisting of a forward and a rearward movement for each revolution of the workpiece. This makes it possible to a certain degree to create an indent in the primary movement path during each revolution, and/or to laterally offset the spiral path relative to the axis of rotation, and/or to slim the spiral shape elliptically.

According to one specific method configuration, there is provision that the secondary transverse movement comprises a stroke, that is to say especially exactly one forwardly and exactly one rearwardly directed second transverse movement, for each revolution of the workpiece, with the result that, in a certain angular rotation position of the workpiece, there is a deviation from the spiral work path of the primary transverse movement. This makes it possible in particular to a certain degree to create a heart-shaped work path from the spiral work path. Here, the heart apex of the heart-shaped work path can serve to move the cutting edge briefly up to the axis of rotation.

Here, the method option consists in the spiral work path having a height profile with at least one crest and one valley, wherein the nearest approach of the stroke to the axis of rotation occurs at the angle of rotation at which the axis of rotation is situated between the cutting edge and the valley. Consequently, use is made of the fact that the cutting edge when approaching the axis of rotation does not come into contact with the surface on the rear side of the axis of rotation, because the valley is positioned there at the moment of the stroke. It is thus possible to a certain degree to operate with the cutting edge to such an extent that it projects into the valley without damaging the end face of the workpiece there. Kinematics can thus be implemented by which prismatic machining is accomplished even with larger tool radii, with the result that the measurement values for spheres and cylinders in the machining centre, that is to say in the region of the axis of rotation, are situated within required tolerances.

For the same reasons there is provision in one specific method variant that, during the nearest approach of the stroke to the axis of rotation, the cutting edge is moved to a point beyond the axis of rotation and into the valley. Specifically, there should be provision here that, during the nearest approach of the stroke to the axis of rotation, the cutting edge hovers in the region of the valley over the end face and is in engagement with the end face on the opposite side from the valley. By virtue of the hovering, the end face is kept damage-free in the region of the valley.

For the machining of an end face which is prismatic and U-shaped in the centre by the axis of rotation, there can optionally also be provision that two strokes of the secondary transverse movement are also carried out corresponding to the two valleys and two peaks for each revolution. This correspondingly applies for even more complex configurations with more crests and valleys for each revolution, with this being rather of theoretical nature. In most cases, the tangent in the region of the axis of rotation can be considered as a prismatic surface.

According to one specific method implementation, with the superimposition of the primary transverse movement by the secondary transverse movement along the spiral work path, at least one indent or heart-like notch of the work path is created in the direction of the axis of rotation. The cutting edge is thus moved more towards the axis of rotation at defined angles of rotation than at others.

The primary transverse movement is preferably exclusively a forward movement. Use can correspondingly be made for this purpose of a relatively inexpensive drive which can additionally implement large adjustment travels.

A method embodiment presents itself in which the primary transverse movement has a continuous speed profile, for example a constant speed. Such a one can also be implemented with a relatively inexpensive drive which is suitable for large adjustment travels.

In one particular method variant, no secondary transverse movement is carried out outside of a limit distance of the cutting edge from the axis of rotation, and the secondary transverse movement occurs only from the limit distance. The machining thus occurs conventionally further to the outside, whereas in the centre the specifics of the cutting edge approach to the axis of rotation can be taken into consideration.

In particular, it has been shown in experiments that the limit distance should be less than 2.00 mm, preferably less than 1.20 mm, further preferably less than 0.70 mm, still further preferably less than 0.50 mm, and particularly preferably less than 0.35 mm. This is because there occurs in this region the phenomenon whereby the cutting edge, as soon as it projects somewhat beyond the axis of rotation, has its rear side come into contact and thus damage the end face. The greater the curvature of the cutting edge, the greater should also be chosen the limit distance.

Depending on how the machining should appear, in particular in the outer region of the end face, the spiral work path can be from the following group: Archimedean spiral, logarithmic spiral or hyperbolic spiral. An Archimedean spiral will most likely be used in order to machine the entire end face by turning. A hyperbolic spiral is particularly suitable for finishing the region of the end face about the axis of rotation. The axis of rotation is approached relatively quickly thereby. In the case of logarithmic spirals, the approach to the axis of rotation occurs particularly slowly. It is therefore optionally appropriate to use an Archimedean or hyperbolic spiral in the outer region and to transfer to a logarithmic spiral upon reaching a limit distance from the axis of rotation.

The workpiece can for example be an optical lens or an optical lens blank. In an addition to the method, there is provision that the workpiece is a blank for spectacle glass manufacture, and a freeform surface by means of which a sight defect of the prescription owner is corrected is produced from the end face on the basis of a prescription by turning.

In addition, there can be provision that, upon completion of the machining of the end face, the circumference of the workpiece is adapted to a spectacle frame. The workpiece can thus be fitted into the rims of the desired spectacle frame.

Furthermore, the invention relates to the use of a tool drive unit as is described above and below or of a turning device as is described above and below for carrying out the method as is described above and below. The use makes it possible to achieve a quick efficient turning machining of end faces which is very precise even in the region of the axis of rotation.

Further features, details and advantages of the invention will become apparent from the wording of the claims and from the following description of exemplary embodiments with reference to the drawings, in which:

FIG. 9 shows a phase diagram with infeed movements and transverse movements.

Figure 1:
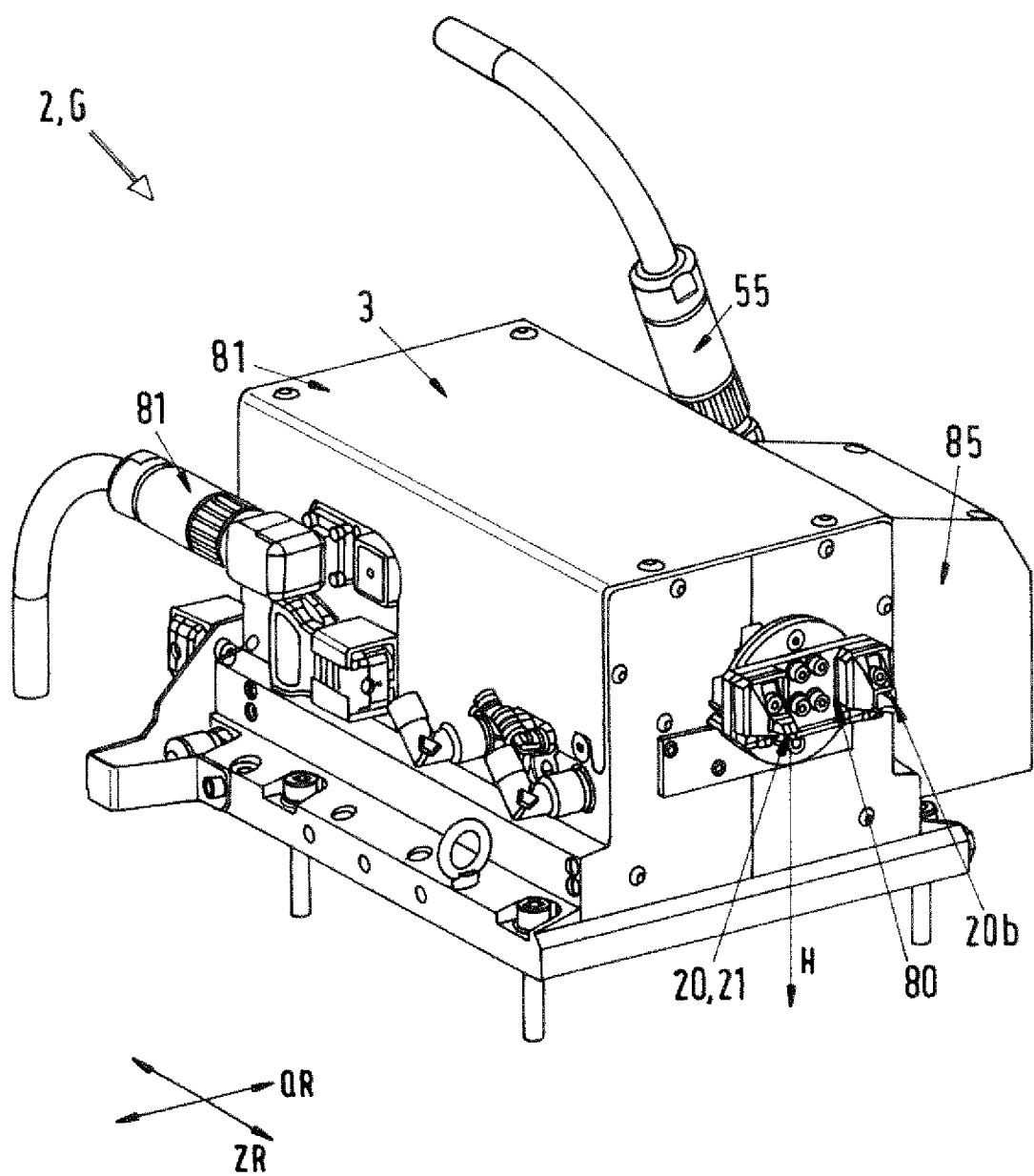
FIG. 1 shows a perspective view of a tool drive unit.
Figure 2:
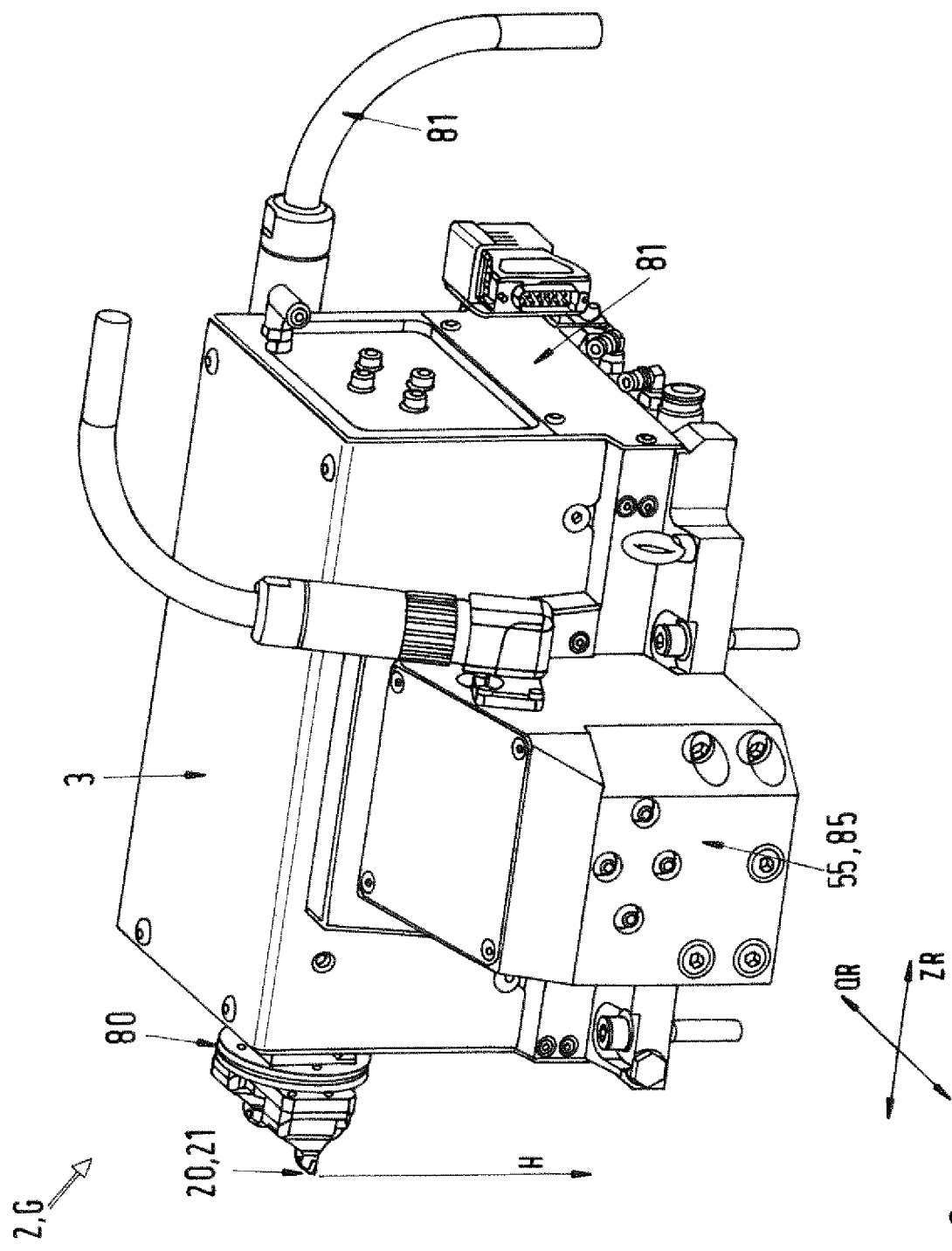
FIG. 2 shows a different perspective view of the tool drive unit according to FIG. 1.

FIG. 1 shows a perspective view of a tool drive unit 2 for a turning device for the cutting machining of workpieces (see FIG. 5), which is configured as an assembly G. This assembly G is illustrated from a different perspective in FIG. 2. Identical reference signs thus refer to identical components, for which reason FIGS. 1 and 2 are described together. The assembly G has a common housing 3. Projecting on one side of the housing 3 is a tool holder 80 in which a turning tool 20 with a defined cutting edge 21 and additionally adjacently a second turning tool 20*b* are received. The cutting edge 21 can consist for example of natural diamond, of synthetic diamond or of ceramic, or have a CVD diamond layer (CVD=chemical vapour deposition) on a carrier substrate. The cutting edge 21 has a main cutting direction H in which the cutting edge 21 and the workpiece 100 are to be moved relative to one another for machining. When using the tool drive unit 2 for machining a lens blank in spectacle glass manufacture, use is preferably made of a cutting edge 21 with a curvature in a cutting edge plane and with a cutting edge radius of the following dimensioning. The curvature of the cutting edge should have a radius between 3.0 mm and 12.0 mm. The cutting edge radius of the cutting edge 21 should be between 0.5 μm and 8.0 μm.

Figure 3:
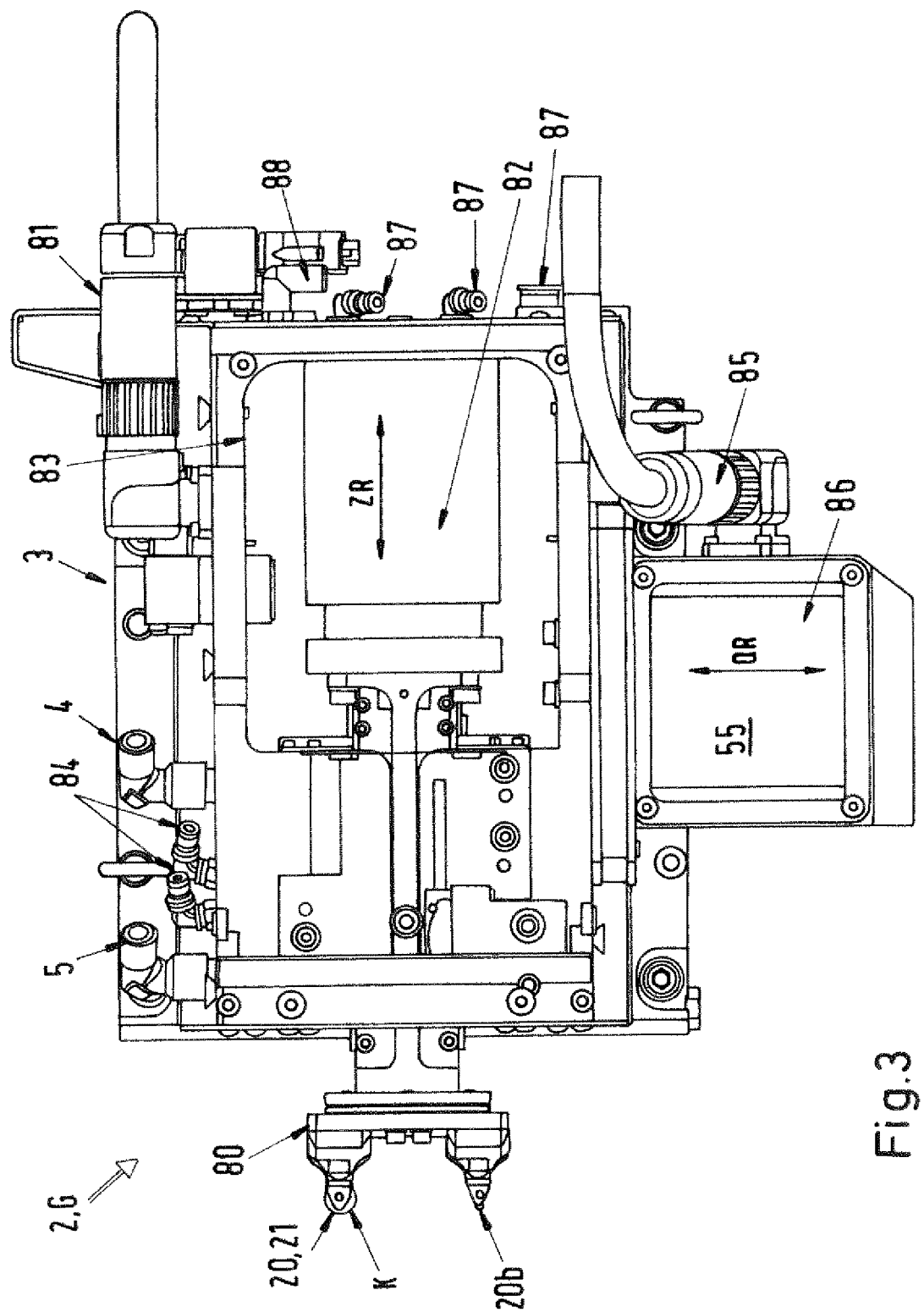
FIG. 3 shows a horizontal section through the tool drive unit according to FIG. 1.

The tool holder 80 is driven in a displaceable manner along an infeed direction ZR by a first linear motor 81. It can be seen in the section according to FIG. 3 that the first linear motor 81 has a first moving coil 82. Alternatively, a first piezo element could also be provided. In addition, the tool holder 80 is driven in a pendular or displaceable manner in a transverse direction QR transversely to the infeed direction ZR by a second linear motor 85. In particular, the transverse direction QR is also oriented transversely to the main cutting direction H. As can be seen in the section of FIG. 3, the second linear motor 85 has a second moving coil 86. Alternatively, a second piezo element can be used here. The second linear motor 85 thus forms a secondary transverse drive 55 for a turning process.

As can further be seen from FIG. 3, the first linear motor 81, together with the tool holder 80, is driven in a displaceable manner in the transverse direction OR by the second linear motor 85. For this purpose, the first linear motor 81 and the tool holder 80 are seated on a slide 83 on which they are mounted in a displaceable manner by means of the second linear motor 85. The tool holder 80 is rigidly connected to the first linear motor 81 and also rigidly connected to the second linear motor 85 indirectly via the slide 83.

Furthermore, FIG. 3 depicts various connections for fluid lines. Thus, a coolant supply line 4 and a coolant discharge line 5 are provided for cooling the assembly G. The slide 83 is lubricated by means of slide lubricant lines 84. Lubricant lines 87 serve to lubricate the bearing of the secondary infeed movement in the infeed direction ZR. Finally, there is also provided a compressed-air connection 88 by means of which pressure is applied to the housing 3 such that no dirt gets into the interior of the housing 3 through any seals.

Such an assembly G as shown in FIGS. 1, 2 and 3 can be arranged for example on a cross slide of a turning device. Such a cross slide then has a cross slide drive by means of which the assembly G is driven in a linearly displaceable manner along the infeed direction ZR and in a linearly displaceable manner along the transverse direction QR.

Figure 4:
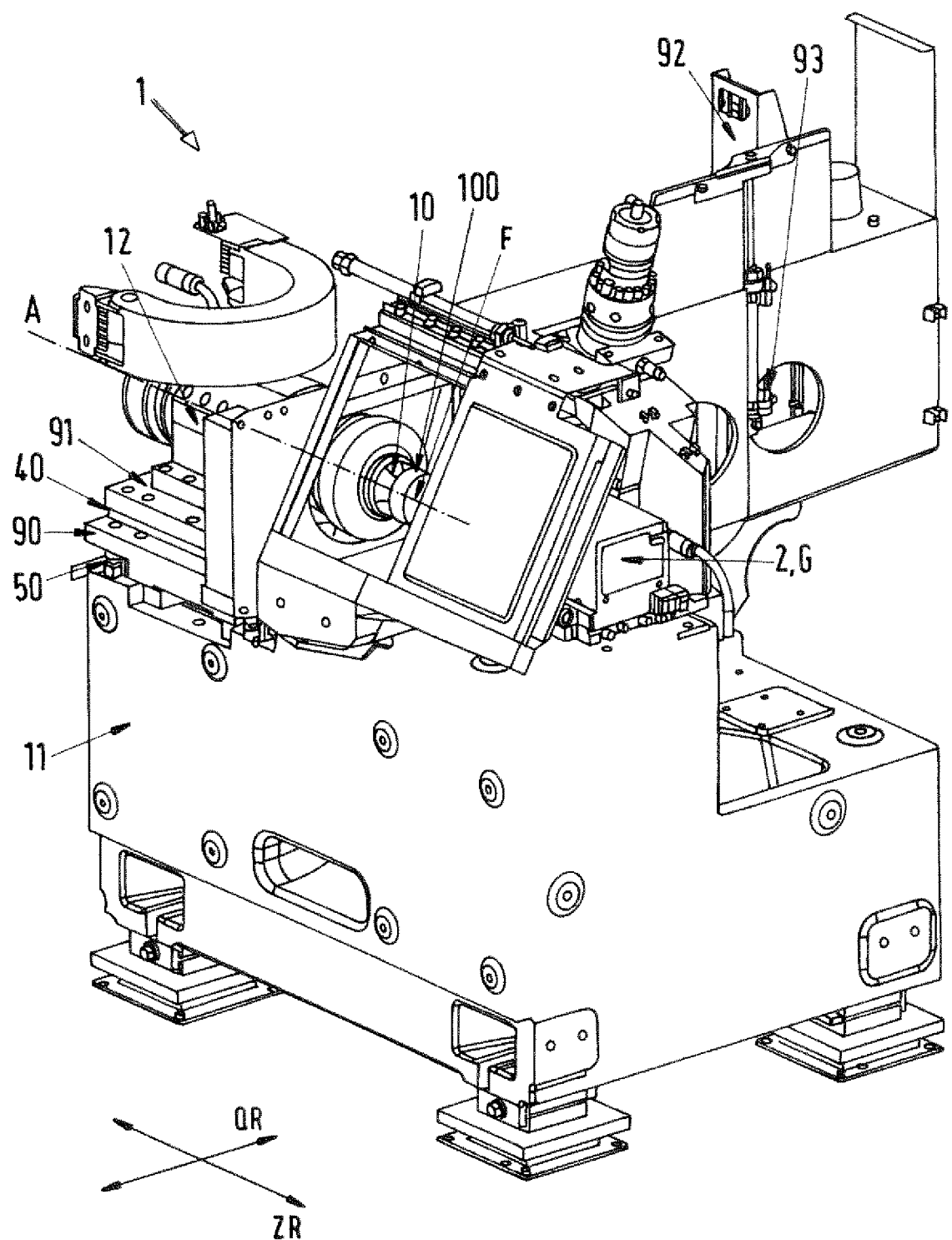
FIG. 4 shows a perspective view of a turning device having a tool drive unit according to the type of FIG. 1.
Figure 5:
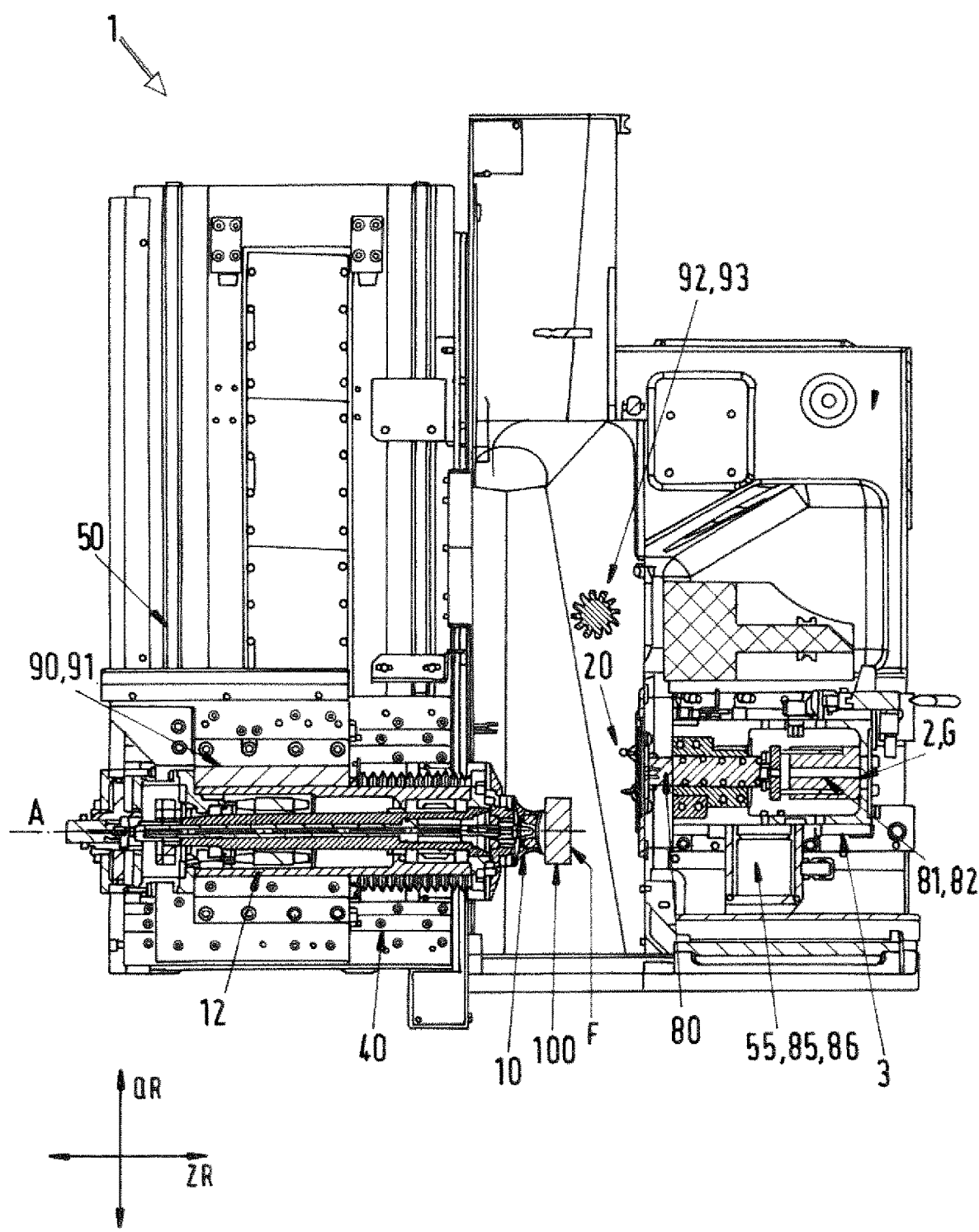
FIG. 5 shows a horizontal section through the turning device according to FIG. 4.

However, as a departure from such an optional use, the cross slide 90 according to the turning device 1 as shown in FIGS. 4 and 5 is arranged on the workpiece side and the assembly G is connected to the machine frame or bed 11 in a positionally fixed manner. The cross slide 90 is likewise seated, opposite the assembly G, on the machine bed 11 and bears the workpiece holder 10 which is designed to receive the workpiece 100 and is driven to rotate about a virtual axis of rotation A. For this purpose, the workpiece holder 10 is driven to rotate by a workpiece spindle drive 12. The workpiece 100 is an optical lens blank having a curved and prismatic end face F for the production of a spectacle glass.

The cross slide 90 forms, on the one hand, a main infeed drive 40 which produces a primary infeed movement in the infeed direction ZR, wherein the turning tool 20 and the workpiece holder 10 or the cutting edge 21 and the end face F of the workpiece 100 can be moved towards one another and away from one other by the infeed movement, this occurs in the present case in the same direction as the axis of rotation A.

On the other hand, the cross slide 90 forms a main transverse drive 50 which produces a primary transverse movement in a transverse direction QR transversely to the infeed direction ZR, wherein the turning tool 20 or its cutting edge 21 and the axis of rotation A can be moved towards one another and away from one another by the primary transverse movement, this occurring in the present case in a transversely directed orientation to the axis of rotation A.

By means of the oppositely arranged tool drive unit 2, in particular the first linear motor 81, a secondary infeed movement is produced in the infeed direction ZR which is oriented in the same direction as that of the main infeed drive 40. As a result, the turning tool 20 and the workpiece holder 10 are driven such that they can be moved towards one another and away from one another by the superimposition of primary and secondary infeed movements.

The second linear motor 85 of the tool drive unit 2 forms a secondary transverse drive 55 whose secondary transverse movements are oriented in the same direction as those of the main transverse drive 50. Consequently, the turning tool 20 or its cutting edge 21 and the axis of rotation A are driven such that they can be moved towards one another and away from one another by the superimposition of primary and secondary transverse movements.

The free adjustment travels of the cross slide 90 are at least ten times greater than the free adjustment travels of the first and second linear motor 81, 85. In addition, the free adjustment travels of the first linear motor 81 along the infeed direction ZR are at least five times as great as the free adjustment travel of the second linear motor 85 in the transverse direction QR. In absolute values, during the spectacle glass production from lens blanks, the free adjustment travel of the first linear motor 81 along the infeed direction ZR is preferably between 5 mm and 60 mm. By contrast, the free adjustment travel of the second linear motor 81 in the transverse direction QR should be only between 0.5 mm and 10.0 mm.

A milling head 93 of an optional milling station 92 in the workspace can also be seen in FIGS. 4 and 5 adjacent to the tool drive unit 2. The workpiece 100 can also be positioned, with the workpiece holder 10 and the cross slide 90, in the milling station 92 for milling machining.

It is now possible with such a turning device 1 to carry out a method for the cutting machining of the end face F of the workpiece 100, which is driven about the virtual axis of rotation A, with the turning tool 20 or its cutting edge 21. In this method, while the workpiece 100 is rotated about the virtual axis of rotation A, the cutting edge 21 is brought into engagement with the end face F of the workpiece 100 at a distance from the axis of rotation A. Already beforehand or starting from the engagement, a primary transverse movement of the cutting edge 21 towards the axis of rotation A is carried out while the cutting edge 21 continues to engage in the end face F of the rotating workpiece 100, with the result that the cutting edge 21 is guided along a spiral work path over the end face F by the superimposition of the rotation of the workpiece 100 and of the transverse movement of the cutting edge 21. Such an engagement situation is illustrated schematically in FIG. 6, where it can be seen that the end face F of the workpiece 100 that is to be machined is situated obliquely, that is to say prismatically, with respect to the virtual axis of rotation A. For example, the workpiece 100 may have already been so obliquely premachined in the milling station 92. The spiral work path thus has a height profile with a crest B and a valley T, wherein the stroke towards the axis of rotation A of the secondary transverse movement occurs at the angle of rotation in which the axis of rotation A is situated between the cutting edge 21 and the valley T.

Figure 6:
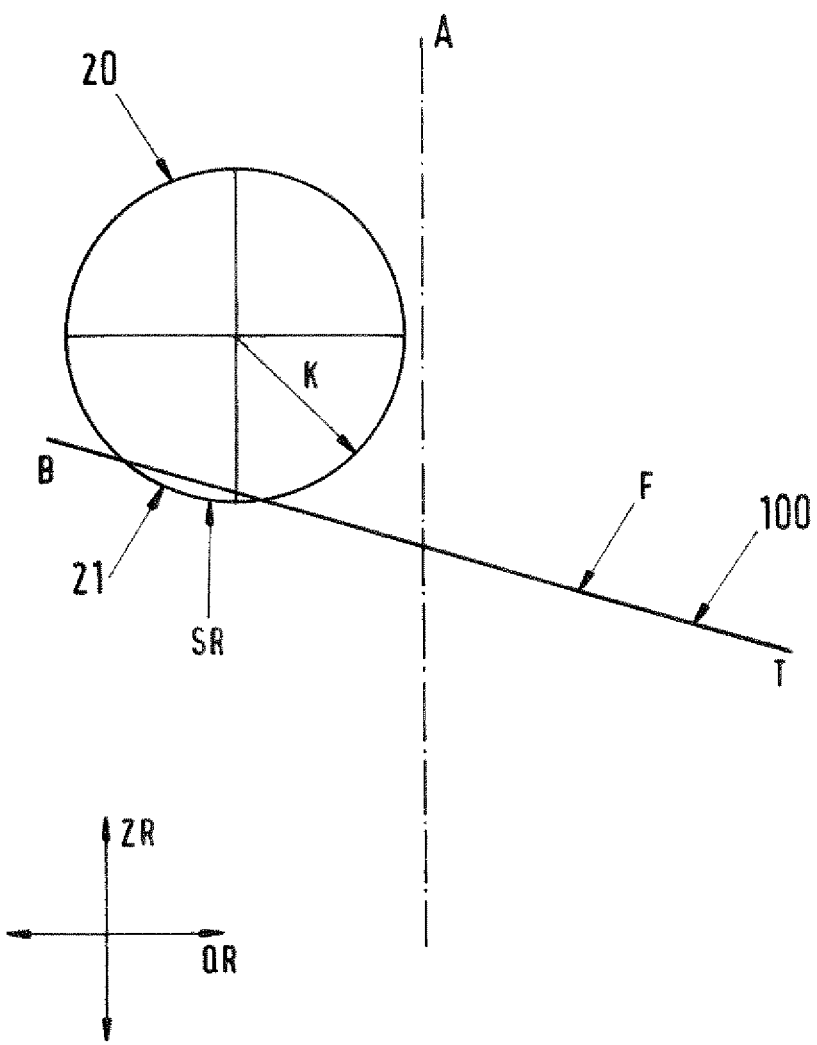
FIG. 6 shows a schematic diagram of a turning tool in engagement with a prismatic end face of a workpiece.

The oblique end face F makes it particularly necessary that, upon each revolution of the workpiece 100, the position of the cutting edge 21 in the infeed direction ZR is to be moved forward and back, as can be seen in the phase diagram according to FIG. 9. Each peak of the profile ZPS, which is illustrated here as cumulated from primary and secondary infeed movements, represents a 360-degree revolution of the workpiece. The closer the cutting edge 21 approaches the axis of rotation A, the smaller the infeed movements ZPS become because the height positions of crest B and valley T of the end face F no longer fall apart so far. FIG. 6 in particular also represents a distance of the cutting edge 21 from the axis of rotation A at which there is no risk at all of the cutting edge rear side coming into contact with the end face F. This corresponds to the portion I in the phase diagram of FIG. 9. Here, the cutting edge 21 is moved towards the axis of rotation A solely by the primary transverse movement, wherein the primary transverse movement is exclusively a forward movement with a continuous, here in particular a linear, speed profile.

According to the method, it is additionally possibly to superimpose the primary transverse movement with an identically directed secondary transverse movement of the cutting edge 21 which occurs towards the axis of rotation A and away from the axis of rotation A, wherein the secondary transverse movement 21 is carried out in dependence on the angle of rotation position of the workpiece 100. The primary transverse movement, which still runs linearly in phase I in FIG. 9, is then considerably superimposed by the secondary transverse movement in phases II and III. No secondary transverse movement is thus carried out outside of a limit distance X of the cutting edge 21 from the axis of rotation A, and the secondary transverse movement occurs only from the limit distance X. In the case of spectacle glass production with a cutting edge curvature K with a radius of 8 mm, it is appropriate to fix the limit distance X at approximately 0.35 mm.

The secondary transverse movement starts slowly in phase II and then develops in phase III. There then results therefrom the cumulated transverse movement curve QPS of primary and secondary transverse movements. It is evident that, on account of the secondary transverse movement, the peaks of the cumulated transverse movement curve QPS are identical in phase with the peaks of the cumulated infeed movements. In the case of the prismatic end face F, this is due to the fact that, for each revolution of the workpiece 100, precisely one nearer approach of the cutting edge 21 towards the axis of rotation A and one movement away again from the axis of rotation A are required in order not to damage the region on that side of the end face F opposite the axis of rotation A by the cutting edge 21.

Figure 7:
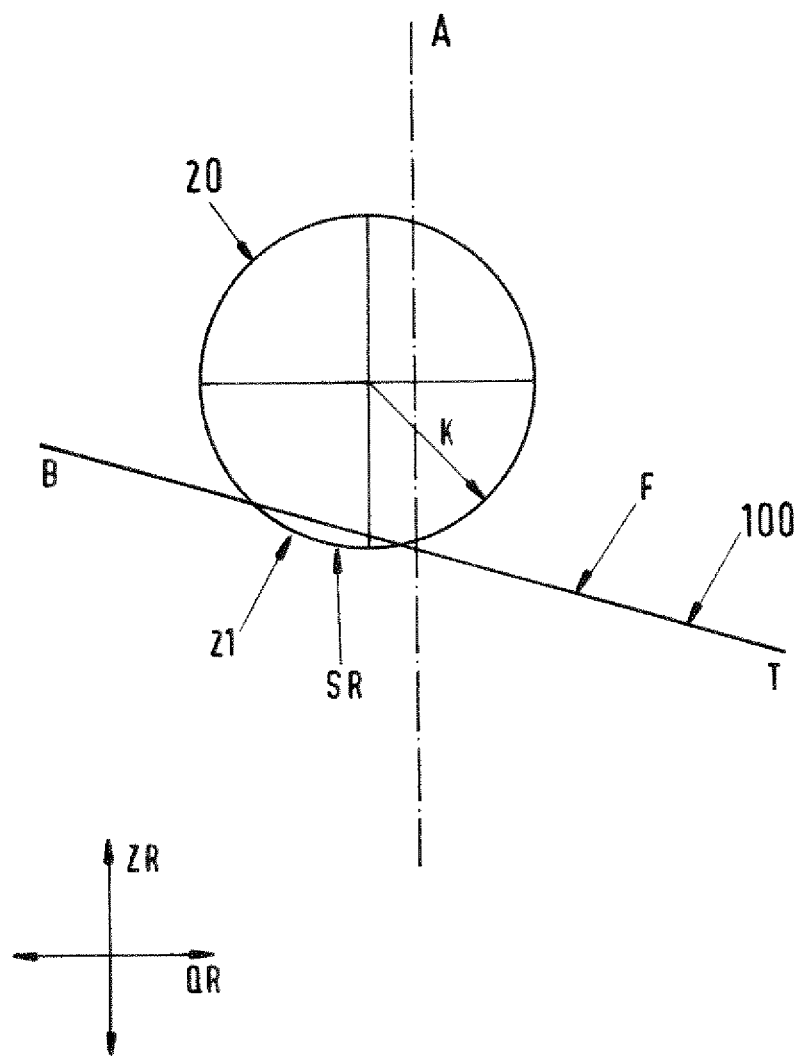
FIG. 7 shows a second schematic diagram of a turning tool in engagement with a prismatic end face of a workpiece.
Figure 8:
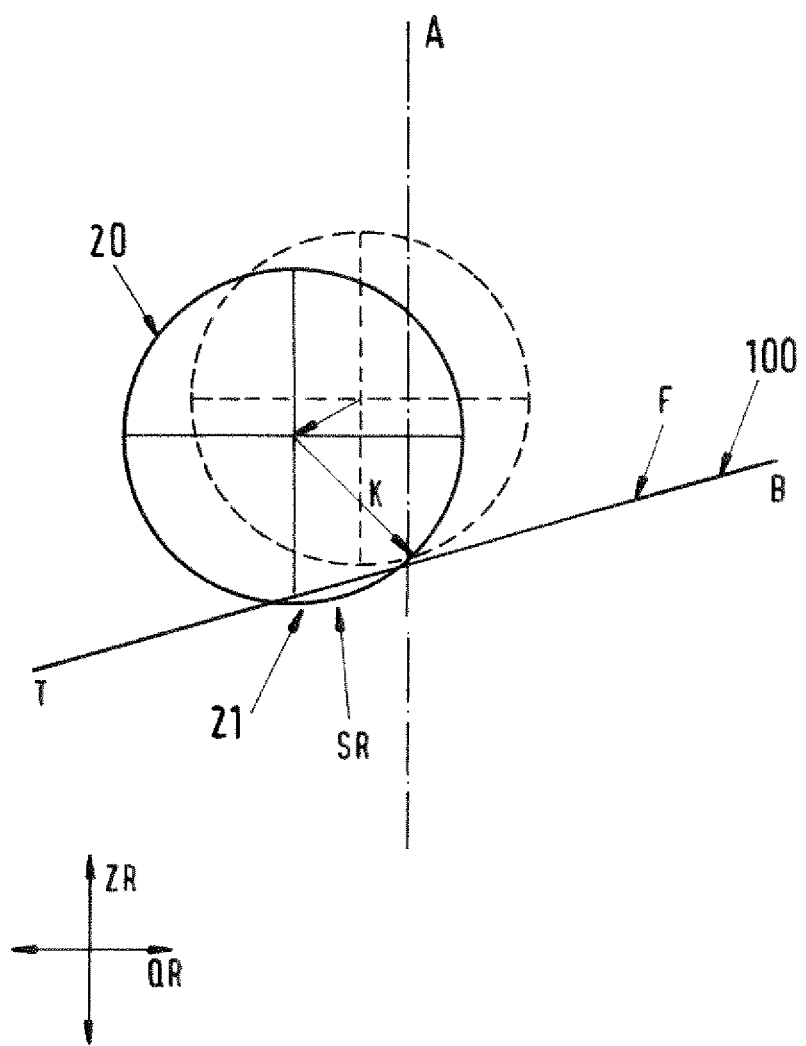
FIG. 8 shows a third schematic diagram of a turning tool in engagement with a prismatic end face of a workpiece.

In this respect, the schematic diagram according to FIG. 7 makes it clear that the here shown approach of the cutting edge 21 towards the axis of rotation A appears uncritical because the cutting edge 21 hovers considerably over the valley side T. If, however, the workpiece 100 is rotated through 180 degrees about the axis of rotation and it is desired to maintain penetration depth of the cutting edge in the end face F by means of a positional change in the infeed direction ZR, this would inevitably lead to contact of the cutting edge with the peak side B. Therefore, as can clearly be seen in FIG. 8, the cutting edge 21 is to be pulled away again a fraction in the transverse direction QR from the axis of rotation A. In order to ensure that the last remaining region around the axis of rotation A can also still be turned, it is finally necessary to reduce the depth of penetration of the cutting edge 21 into the end face F, with ultimately, for each penetration depth, the retraction according to the invention of the cutting edge 21 in the transverse direction being maintained in order to cause no damage to the end face F on the peak side B and nevertheless to be able to approach the axis of rotation A to the maximum extent. In this respect, it becomes clear from the curve ZPS of FIG. 9 that the cumulated infeed movement becomes not only ever smaller but at the end of phase III is reduced once to the value zero for each revolution. Consequently, the material removal occurs only adjacent to this angle of rotation position of the workpiece 100, with the maximum material removal occurring on the peak side B. Finally, the value zero is reached at the point of intersection of the horizontally marked zero point line and the axis of rotation A.

If the effect of the secondary transverse movements were considered on the basis of the change in an Archimedean spiral due to the primary transverse movement, it would be recognized that it is in particular always the case that an approach towards the axis of rotation A occurs on the peak side B and a movement away from the axis of rotation A occurs on the opposite valley side T. There then results a deformation or de-concentric positioning of the actual Archimedean spiral, for example an indent or heart-like notch of the work path in the direction of the axis of rotation A or else a displacement of the centre point of the work path in relation to the axis of rotation A. This particularly also depends on how quickly the secondary transverse movements are carried out.

The invention is not limited to one of the above-described embodiments but can be modified in a wide variety of ways.

All the features and advantages emerging from the claims, the description and the drawing, including constructional details, spatial arrangements and method steps, may be essential to the invention both on their own and in a wide variety of combinations.

| List of reference signs | |
|---|---|
| 1 | Turning device |
| 2 | Tool drive unit |
| 3 | Housing |
| 4 | Coolant supply line |
| 5 | Coolant discharge line |
| 10 | Workpiece holder |
| 11 | Machine bed |
| 12 | Workpiece spindle drive |
| 20 | Turning tool |
| 20b | Second turning tool |
| 21 | Cutting edge |
| 40 | Main infeed drive |
| 50 | Main transverse drive |
| 55 | Secondary transverse drive |
| 80 | Tool holder |
| 81 | First linear motor |
| 82 | First moving coil |
| 83 | Slide |
| 84 | Slide lubricant lines |
| 85 | Second linear motor |
| 86 | Second moving coil |
| 87 | Lubricant line |
| 88 | Compressed-air connection |
| 90 | Cross slide |
| 91 | Cross slide drive |
| 92 | Milling station |

-continued

| List of reference signs | |
|---|---|
| 93 | Milling head |
| 100 | Workpiece |
| A | Axis of rotation |
| B | Crest |
| F | End face |
| G | Structural unit |
| H | Main cutting direction |
| K | Curvature |
| QPS | Primary and secondary transverse movement |
| QR | Transverse direction |
| T | Valley |
| SR | Cutting edge radius |
| X | Limit distance |
| ZPS | Primary and secondary infeed movement |
| ZR | Infeed direction |

The invention claimed is:

1. A method for the cutting machining of an end face (F) of a workpiece (100), which is driven about a virtual axis of rotation (A), with a turning tool (20) having a cutting edge (21), wherein the workpiece (100) is an optical lens or an optical lens blank and the end face (F) of the workpiece is curved, the method comprising the following steps:
rotating the workpiece (100) about the virtual axis of rotation (A);
bringing the cutting edge (21) into engagement with the curved end face (F) of the workpiece (100) at a distance from the axis of rotation (A);
carrying out a primary transverse movement of the cutting edge (21) towards the axis of rotation (A) while the cutting edge (21) continues to engage in the curved end face (F) of the rotating workpiece (100), with the result that the cutting edge (21) is guided along a spiral work path over the curved end face (F) by the superimposition of the rotation of the workpiece (100) and of the transverse movement of the cutting edge (21),
superimposing the primary transverse movement with an identically directed secondary transverse movement of the cutting edge (21) which occurs towards the axis of rotation (A) and away from the axis of rotation (A), wherein the secondary transverse movement (21) is carried out in dependence on the angle of rotation position of the workpiece (100).

2. The method according to claim 1, characterized in that the secondary transverse movement of the cutting edge (21) comprises exactly one stroke consisting of a forward and a rearward movement for each revolution of the workpiece (100).

3. The method according to claim 2, characterized in that the spiral work path has a height profile with at least one crest (B) and one valley (T), wherein the nearest approach of the stroke to the axis of rotation occurs at the angle of rotation in which the axis of rotation (A) is situated between the cutting edge (21) and the valley (T).

4. The method according to claim 2, characterized in that, during the nearest approach of the stroke to the axis of rotation, the cutting edge (21) is moved to a point beyond the axis of rotation (A) and into the valley (T).

5. The method according to claim 4, characterized in that, during the nearest approach of the stroke to the axis of rotation, the cutting edge (21) hovers in the region of the valley (T) over the curved end face (F) and is in engagement with the curved end face (F) on the opposite side from the valley (T).

6. The method according to claim 1, characterized in that, with the superimposition of the primary transverse movement by the secondary transverse movement along the spiral work path, at least one indent or heart-like notch of the work path is created in the direction of the axis of rotation (A).

7. The method according to claim 1, characterized in that the primary transverse movement is exclusively a forward movement.

8. The method according to claim 1, characterized in that the primary transverse movement has a continuous speed profile.

9. The method according to claim 1, characterized in that no secondary transverse movement is carried out outside of a limit distance (X) of the cutting edge (21) from the axis of rotation (A), and the secondary transverse movement occurs only from the limit distance (X).

10. The method according to claim 9, characterized in that the limit distance (X) is less than 2.00 mm.

11. The method according to claim 1, characterized in that the spiral work path is from the following group: Archimedean spiral, logarithmic spiral or hyperbolic spiral.

12. The method according to claim 1, wherein the cutting machining of the curved end face produces a machining surface which has a tangent which is not orthogonal to the virtual axis of rotation (A) in the region of the virtual axis of rotation (A).

* * * * *